(12) United States Patent
Clark

(10) Patent No.: US 6,562,240 B1
(45) Date of Patent: May 13, 2003

(54) MIXING APPARATUS

(75) Inventor: Neville Clark, Victoria (AU)

(73) Assignee: Separation Technologies Group Pty. Ltd., East Hawthorn (AU)

( * ) Notice: Subject to any disclaimer, the term of this patent is extended or adjusted under 35 U.S.C. 154(b) by 0 days.

(21) Appl. No.: 09/486,616

(22) PCT Filed: Aug. 27, 1998

(86) PCT No.: PCT/AU98/00691
§ 371 (c)(1),
(2), (4) Date: May 15, 2000

(87) PCT Pub. No.: WO99/11352
PCT Pub. Date: Mar. 11, 1999

(30) Foreign Application Priority Data

Aug. 29, 1997 (AU) .............................................. PO 8875

(51) Int. Cl.$^7$ .............................. C02F 1/24; B03D 1/14; B01F 3/04
(52) U.S. Cl. ................... 210/703; 210/205; 210/221.2; 366/165.1; 366/165.4; 261/79.2
(58) Field of Search ............... 210/703, 221.2, 210/205; 366/165.4, 165.1, 165.2; 261/79.2

(56) References Cited

U.S. PATENT DOCUMENTS

| | | | |
|---|---|---|---|
| 3,400,818 A | * | 9/1968 | Tarjan |
| 3,446,353 A | * | 5/1969 | Davis |
| 4,065,385 A | * | 12/1977 | Aktay et al. |
| 4,279,743 A | * | 7/1981 | Miller |
| 4,613,431 A | * | 9/1986 | Miller |
| 4,964,733 A | * | 10/1990 | Fredriksson et al. |
| 4,997,549 A | * | 3/1991 | Atwood |
| 5,049,320 A | * | 9/1991 | Wang et al. |
| 5,160,611 A | * | 11/1992 | Krofta |
| 5,167,806 A | * | 12/1992 | Wang et al. |
| 5,350,525 A | | 9/1994 | Shaw et al. |
| 5,407,584 A | | 4/1995 | Broussard, Sr. |
| 5,458,738 A | * | 10/1995 | Chamblee et al. |
| 5,492,622 A | | 2/1996 | Broussard |
| 5,522,999 A | | 6/1996 | Broussard |
| 5,529,190 A | * | 6/1996 | Carlton et al. |
| 5,662,790 A | * | 9/1997 | Carlton et al. |
| 6,019,497 A | * | 2/2000 | Ingerttilä a et al. |
| 6,106,711 A | * | 8/2000 | Morse et al. |

FOREIGN PATENT DOCUMENTS

EP  0 624 3989 A1  11/1994

* cited by examiner

*Primary Examiner*—Thomas M. Lithgow
(74) *Attorney, Agent, or Firm*—Michael Best & Friedrich LLP

(57) ABSTRACT

A method and apparatus for mixing a first material and a second material is described in which the first material comprises a mixture of two or more dissimilar components which it is desired to separate. The method and apparatus involve forming an intimate mixture of the two materials prior to separating the two dissimilar components of the first material. The apparatus involves the use of a hydrocyclone for aerating or gasifying a feed stream, such as waste water containing oleophilic residue or food residue, to entrain the particles of residue within the air or gas bubbles prior to separating the oil or food residues from the carrier material, typically water. Instead of using the hydrocyclone as a separator, it is used as a mixer which provides surprising results and facilitates separation of the aerated components.

25 Claims, 1 Drawing Sheet

MIXING APPARATUS

Figure 1:
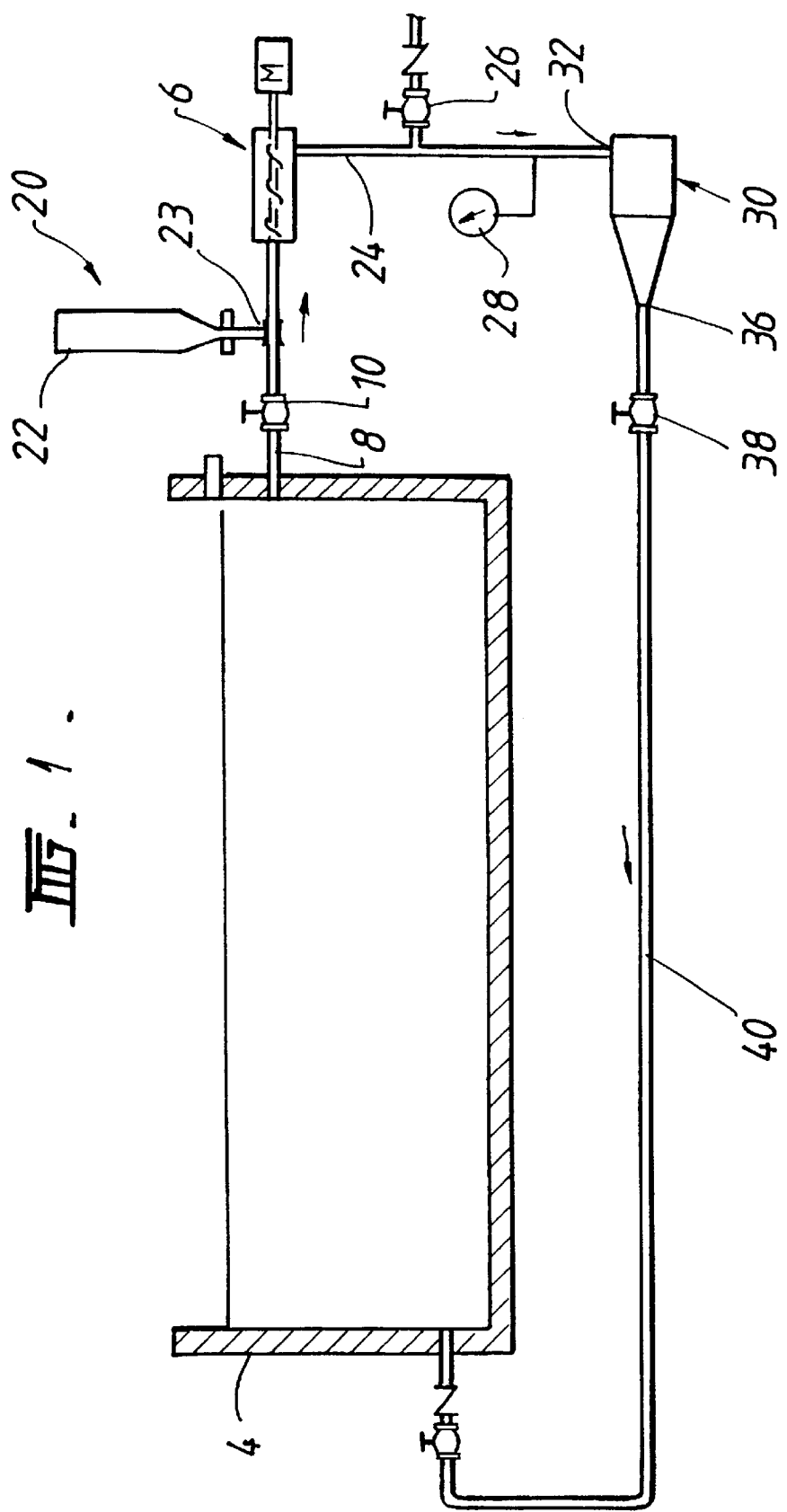

The present invention relates generally to chemical processing of materials in industry and particularly to individual steps involved in the overall processes used in the chemical processing industry, particularly in industries involved in the separation of different materials from each other. More particularly, the present invention relates to improvements in chemical processing of two or more dissimilar materials where the dissimilar materials are to be separated from each other either in the one step or in different steps. Even more particularly, the present invention relates to a mixing step as a pretreatment or to improvements in the mixing step of an overall process of separating two or more different materials from each other, particularly two or more substantially immiscible fluids or fluids which can be separated on the basis of one or more properties or characteristics possessed by the individual fluids, such as their respective densities. The present invention finds particular application in methods and apparatus using hydrocyclones to mix two fluids together as a pretreatment step as one of the steps in the overall process of separating two different materials, such as oil or oil-like material and water from each other, and optionally separating suspended solid particles from the fluid in which the particles are suspended, typically water. However, the apparatus and method of the present invention may also be used as a mixer to incorporate one material into another material where there is to be no or substantially no separation of the two materials, such as for example, where a gas is to be incorporated into a liquid either temporarily or permanently, such as for example a carbonated beverage.

Although the present invention will be described with particular reference to the use of a hydrocyclone to mix air with waste water containing petroleum derived contaminants such as oils and lubricants or wastes from the food processing industry, such as dairy products, by forming an emulsion or similar mixture as a result of mixing the air and water under shearing conditions, it is to be noted that the present invention is not limited in scope to the described embodiment, but rather the scope of the present invention is more extensive so as to include other arrangements of the apparatus, other uses of the apparatus and methods, and application of the apparatus and methods in industries other than the oil or petroleum industry or food processing industry. Examples of the other industries in which the present invention finds particular application include the food industry generally, and the beverage industry in particular, including the fresh fruit juice industry and dairy industry.

Hydrocyclones have conventionally been used in the chemical processing industry to separate two dissimilar materials either two immiscible liquids, or solids and liquids, particularly suspended solids in liquids, from each other. In the past, hydrocyclones have been used to separate the two components of the mixture being treated on the basis of one or more properties or characteristics possessed by one or other of the components so that each component could be discharged separately through selected outlets of the hydrocyclone. Typically, the two components have been separated on the basis of their different specific gravities or densities. Feed containing the components to be separated is introduced into the hydrocyclone at or towards the top of the hydrocyclone and mostly spirals down the body of the hydrocyclone where it is discharged from an outlet located at the base of the hydrocyclone (the underflow) while the lower density component moves into a centrally located vortex created internally within the hydrocyclone body and is drawn out of another outlet which is located at the top of the hydrocyclone by the lower pressure developed in the hydrocyclone. Thus, to date hydrocyclones have always had two different outlets for different outlet streams and have been used to separate materials.

The present inventor has most surprisingly discovered that hydrocyclones can also be used to mix different materials together to achieve beneficial results rather than merely to separate the materials. One of the beneficial results of using the hydrocyclone as a mixer is to aid or facilitate subsequent processing of the materials by either maintaining the different materials as a mixture or separating the different materials in the mixture from each other. Furthermore, it has been surprisingly discovered by the present inventor that in an overall process of separating two or more different materials, if a hydrocyclone is used to mix the different materials together as a pretreatment before the actual separating process begins, the materials are more readily separated in the subsequent processing, or conversely, may form a better or more long-lasting mixture that can assist in the subsequent separation of the materials than if the pretreatment is not used.

Even more particularly, it has surprisingly been discovered by the inventor that introducing air or a gas into the mixture prior to the mixture entering the hydrocyclone greatly assists in the subsequent separation of the two dissimilar materials from each other than if air or gas is not used, even though the two materials are more intimately mixed together before any separating process or steps are commenced. It is totally unexpected that by more intimately mixing the components of a mixture, the components can be more readily separated from each other.

The method and apparatus of the present invention find application in chemical processing industries as diverse as the petroleum industry, such as in applications like oil field production water separation, refinery process water separation, petrochemical waste water separation and ballast water separation, in the food and beverage industries, such as for example separating waste from water in the dairy industry or beverage production industry, or mixing gases such as carbon dioxide with drinks such as beer or soft drinks, or in any industry requiring mixing of and/or separation of two dissimilar materials such as immiscible fluids, separation of two or more fluids of different densities or gravities, separation of solids or suspended solids from liquids and aeration or gasification of fluids. The types of materials in the petroleum industry which may be treated by the apparatus and method of the present invention include light hydrocarbons, heavy hydrocarbons, lubricants, fatty oils and fats, miscellaneous oil materials and the like.

According to the present invention there is provided a method of mixing a first material and a second material using a mixing apparatus wherein the first material comprises a mixture of two dissimilar components, in order to facilitate separation of the two dissimilar components from each other, characterised in that the first material is introduced into the mixing apparatus through a first inlet, the second material is introduced through a second inlet, the mixing apparatus is operated in such a manner that the second material is drawn into the mixing apparatus along with the first material so that mixing of the first and second materials occurs under conditions of shear to form an intimate mixture of the first and second materials, and the intimate mixture is discharged from the mixing apparatus, whereby separation of the two dissimilar components of the first material is facilitated by forming the intimate mixture of the first and second materials.

According to another aspect of the present invention there is provided a mixing apparatus for forming an intimate mixture of a first material and a second material wherein the first material comprises a mixture of two dissimilar components, characterised in that the apparatus comprises a first inlet means for admitting the first material to the mixing apparatus, a second inlet means for admitting the second material, a mixing chamber for forming an intimate mixture of the first and second materials under conditions of shear, and an outlet means for discharging the intimate mixture of the first and second materials, whereby separation of the two dissimilar components of the first material from each other is facilitated by the formation of the intimate mixture of the first and second materials.

According to another aspect of the present invention the apparatus may be used to form a more or less stable mixture of two dissimilar components where the mixture separates into the two components over a prolonged period of time or remains as an intimate mixture for a substantial period of time.

Typically, the first material is water or an aqueous solution or the like. Typically, the second material is a gas, such as air, nitrogen, oxygen, natural gas or the like.

Typically, the first material is a waste water mixture comprising water and oil or an oil-like or oleophilic material as the two dissimilar components. Typically, the first material is a beverage such as a soft drink, beer or the like. More typically, the aeration or gasification of the contaminated waste water facilitates separation of the oil or oil-like component from the water by the oil being entrained or otherwise associated with the air bubbles or gas bubbles formed from mixing the air or gas with the waste water under conditions of shear in the apparatus of the present invention. More typically, the beverage is gasified by the introduction of air or carbon dioxide to form an aerated or gasified drink under pressure.

Typically, the mixing apparatus is a hydrocyclone or hydrocyclone-like arrangement. More typically, the hydrocyclone is provided with an inlet. Even more typically, the inlet is the only inlet of the hydrocyclone. More typically, the two materials are premixed before entering the hydrocyclone.

Typically, the second inlet is located in a conduit leading to the hydrocyclone. More typically, the conduit is for conveying the waste water to the inlet of the hydrocyclone. Even more typically, the inlet is an air injection port, venturi or the like located in the conduit so that air or gas is mixed with the waste water prior to it entering the hydrocyclone arrangement. More typically, a mixture of gas/air and water enters the hydrocyclone where it is further mixed under conditions of shear to form an intimate mixture of entrained air or gas bubbles in the waste water. Typically, the amount of air admitted is controlled by a control means located in the conduit in the vicinity of the air inlet.

Typically, the amount of air/gas admitted to and mixed with the waste water is from about 1% to 50% by volume, more typically about 10% to 355% by volume, and even more typically 20% to 30% by volume, based on the total volume of the mixture.

Typically, the outlet means discharges the intimate mixture of gas/air bubbles and waste water to a conduit where it can be conveyed to a further processing step or stage. In the intimate mixture, the oil contaminants are associated with the gas or air bubbles for easier separation in a further processing step. More typically, the amount of air or gas bubbles is greater than the amount of oil or oil-like material to be separated from the waste water.

The hydrocyclone when used in the method and apparatus of the present invention does not do any separating itself, but rather "draws" air, typically at the suction side of a positive displacement pump, into the conduit leading to the hydrocyclone, dissolving the air and mixing it well with the waste water. The result is the formation of millions of tiny air bubbles which can entrain oil droplets, suspended solid particles or the like, so that the air bubbles can then bring the suspended solids or droplets to the surface during subsequent processing to assist in separation of these materials from each other. Without the hydrocyclone as a mixer in the pretreatment step there is a non-uniform distribution of air bubbles and large slugs of air which leads to less satisfactory separation of the two dissimilar components of the waste water.

The present invention will now be illustrated by an example which is non-limiting. This example will be described with reference to the accompanying drawing in which FIG. 1 is a schematic flow chart showing one arrangement of the mixing apparatus of the present invention as part of a larger overall installation.

In FIG. 1 there is shown schematically one form of the installation in which the apparatus of the present invention may be used to facilitate separation of two components of a mixture. The described embodiment will be illustrated with reference to separating oil, and possibly suspended solids, from water in the petroleum industry, such as for example separating oil from waste wash-water or run-off water collected in a pit, tank, vessel or the like. In this example, oil, and possibly suspended solids, need to be separated from water before the water can be recycled for reuse or disposed of through the normal stormwater drainage system for return to natural waterways.

Water contaminated with petroleum products, such as oil, lubricants and the like, and possibly including solids and suspended solids, is pumped from a holding and/or collecting vessel 4 by a suitable pump 6 through a conduit 8. It is to be noted that collecting vessel 4 can take any form or arrangement. A valve 10 is located in conduit 8 for controlling the volume of air admitted to conduit 8 by an aspiration unit 20 which is located in conduit 8 intermediate valve 10 and pump 6. Aspiration unit 20 comprises a gas reservoir 22 or similar such as an air suction pipe or the like for maintaining a supply of gas or air to conduit 8 for mixing with the waste water therein and a restricting means 23 in the form of a valve for controlling the amount of gas being admitted to conduit 8. Aspiration unit 20 is in effect a venturi or air injection port for admitting air to conduit 8 for mixing with the waste water being pumped therethrough. The restricting means 23 may take any suitable form and assists in regulating the amount of gas/air being admitted to conduit 8 in accordance with requirements to facilitate ultimate separation of the oil and water into two separate, individual components. Typically, the gas is air. However, depending on applications the gas may be oxygen, nitrogen, natural gas or any other gas or combination of two or more gases.

It is to be noted that control valve 10 may be located either upstream of or downstream of pump 6. The aspiration unit 20 may be a normal, natural aspiration unit operated at atmospheric pressure or it may be a forced aspiration unit operating at increased pressure. Typically, the aspiration unit 20 admits about 25% by volume air to about 75% by volume waste water in conduit 8.

A conduit 24 extends from pump 6 to a mixing apparatus 30 in the form of a hydrocyclone 30, particularly a coalescing hydrocyclone. A suitable fitting is provided in conduit 24 in the form of an inlet port 26 allowing the introduction of chemical additives, such as for example flocculants or the like, to assist in the subsequent separation of the waste water, particularly for entrainment of the oil droplets in the air bubbles. A gauge or sensor 28 or the like is provided in conduit 24 intermediate inlet port 26 and hydrocyclone 30 to provide information to assist in regulating the operation of the installation, particularly the flow rate through the various conduits, and the amount of air/gas being introduced through the second inlet being the restricting means 23 of the aspiration unit 20.

Hydrocyclone 30 is provided with an inlet 32 in fluid communication with the body 34 of hydrocyclone 30 for admitting the mixture of gas or air and the waste water to the hydrocyclone. An outlet 36 is provided at or towards one end of the hydrocyclone. The normal second outlet of conventional hydrocyclones is either not used by being blanked off with a suitable closure means or not provided since the hydrocyclone of the present invention is being used as a mixing apparatus and not as a separating apparatus which is the conventional use of such apparatus and thus does not require two separate outlets for the two separated components produced by the hydrocyclone. However, in other applications, the second outlet is present in order to provide increased control over operation of the hydrocyclone to intimately mix the oil and water under shear conditions, such as by regulating the back pressure within the hydrocyclone.

Sensor and valve arrangement 38 is provided in conduit 40 extending from outlet 36 of hydrocyclone 30 back to vessel 4 or more particularly to a stand pipe in vessel 4 leading to a separator. The pressure in hydrocyclone 30 is sensed by the sensor and valve 38 operated to maintain a slight back pressure in hydrocyclone 30 to aid in mixing of air and waste water under conditions of shear in hydrocyclone 30. By maintaining the back pressure in hydrocyclone 30 above a predetermined value by control valve 38, the air and waste water are forced to mix in hydrocyclone 30 to aid separation of the oil and water more readily.

Alternatively, hydrocyclone 30 is provided with two outlets which are joined together before valve arrangement 38 so that all of the intimately mixed oil/water/gas mixture is passed for subsequent processing and separation.

Additionally, the hydrocyclone can be provided with a solids collector located at or towards the base of the hydrocyclone near the underflow outlet to collect solids separated from the feed mixture. In this arrangement, the main discharge of the aerated intimate mixture from the hydrocyclone is through the overflow outlet located at or towards the top of the hydrocyclone. In this embodiment, the solids collector is periodically cleared of collected solids.

The air/water mixture in hydrocyclone 30 is subjected to shear forces in the hydrocyclone sufficient to form an emulsion or similar of the air being the dispersed phase, or the dispersed fluid, in the dispersion fluid or media which is the water.

As the air/water mixture is propelled through the hydrocyclone at high velocity, a shearing force is created, causing the gas to form a myriad minute bubbles. Oil particles and suspended solids attach themselves to the gas bubbles as the bubbles are propelled through the hydrocyclone and conduits of the installation so that when the mixture is released from the hydrocyclone to a holding vessel or returned to the original vessel via the outlet means and associated conduit and allowed to stand for a period of time, the air bubbles rise to the surface where the oil droplets and suspended solid particles collect in a more or less dense foam or froth on the surface of the vessel. As the froth or foam contains the contaminated oil and/or solids, removal of the froth or foam by any suitable means, such as for example by a suitable skimmer arrangement, also removes the oil and solid contaminants from the water thereby effecting separation of oil from the water allowing the water to be recycled or disposed to waste.

It is to be noted that a second chemical injection point is optionally provided in conduit 40 to allow the injection of selected or desired chemical additives to the intimate mixture of the water and gas flowing in this conduit. An example of a chemical additive is a flocculent to assist in the separation. Other chemical injection points are provided at various other locations in the flow path.

The hydrocyclone mixer apparatus of the present invention finds particular application as an additional component in the overall installation to pretreat the contaminated waste water before it undergoes more conventional separation using conventional separating techniques, equipment or methods or using the innovative separating apparatus and methods of the present inventor which form the subject of co-pending applications. The mixing apparatus of the present invention does not take the place of existing separating apparatus but is used in combination therewith and provides a hithertobefore unknown and novel use of hydrocyclones which have not been used in the same manner previously.

The method and apparatus of the present invention find application in a wide variety of industries, such as the petroleum industry, food processing industry, ground water reclamation and mediation, and the like.

Advantages of the method and apparatus of the present invention involving dissolving air/gas into all of the waste are as follows:

Opportunity for contaminants, particularly food residues, to attach to the air/water interface of the intimate mixture, particularly in the first 100 milliseconds after bubble formation.

More waste particles have the opportunity to act as nuclei for bubble formation.

The total number of air bubbles generated is high which allows for increased throughput of waste material and treatment of waste material having increased amounts of waste residues.

Good mixing of the air with the waste.

Should ensure good mixing of air in water; and

Cause collisions between particles.

The apparatus is effective in producing millions of tiny air bubbles.

Low levels or nor flocculent required in some applications, which translates to lower operating costs and a more robust process because there is one less parameter which can go wrong and upset the process.

The shearing of solid particles and subsequent decrease in their natural tendency to form flocs is reduced as shearing is minimised by "sucking" air into the apparatus and using the hydrocyclone as a mixer.

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

What is claimed is:

1. A method of mixing a first material and a second material using a hydrocyclone, wherein the first material comprises a mixture of two dissimilar components in order to facilitate separation of the two dissimilar components from each other, said first material being conveyed to the hydrocyclone by a pump, the method including introducing the first material into the hydrocyclone through a first inlet, introducing the second material through a second inlet, said second inlet being located upstream of the location of the pump, operating the hydrocyclone in such a manner that the second material is drawn into the hydrocyclone along with the first material through the first inlet so that mixing of the first and second materials occurs in the hydrocyclone under conditions of shear to form an intimate mixture of the first and second materials within the hydrocyclone, and discharging the intimate mixture from the hydrocyclone, whereby separation of the two dissimilar components of the first material from each other is facilitated by forming the intimate mixture of the first and second materials under conditions of shear in the hydrocyclone.

2. A method according to claim 1, in which the first material is waste water, an aqueous solution or aqueous residue containing a contaminant material.

3. A method according to claim 2, in which the second material is a gas, air, nitrogen, oxygen or natural gas.

4. A method according to claim 2, in which the first material is a waste water mixture comprising as one component water, and as the other component an oil or oleophilic material.

5. A method according to claim 1, in which the first material is a beverage, including a soft drink, beer, fruit juice or other drink.

6. A method according to claim 4, in which mixing of the gas with the water or waste water causes aeration or gasification of the contaminated waste water, which facilitates separation of the oil or oleophilic component from the water by the oil being entrained or otherwise associated with the air bubbles or gas bubbles formed from intimately mixing the air or gas with the waste water under conditions of shear.

7. A method according to claim 1, in which the hydrocyclone is provided with outlets and the intimate mixture of the first and second materials is discharged from the hydrocyclone through the single outlet or through two outlets, with the proviso that if there are two outlets both outlets are joined together to form a single stream of the intimate mixture of the two materials.

8. A method according to claim 3, in which the amount of air/gas admitted to and mixed with the waste water is from 1% to 50% by volume based on the total volume of the mixture.

9. A method according to claim 3, in which when the gas/air and waste water enter the hydrocyclone in a premixed condition, the mixture being further mixed under conditions of shear to form an intimate mixture of entrained air or gas bubbles in the waste water in the hydrocyclone.

10. A method according to claim 3, in which the amount of air admitted to the hydrocyclone is controlled by a control means located in a conduit forming the inlet for the air or gas.

11. A method according to claim 8, in which the amount of air/gas mixed with the waste water is from 10% to 35% based on the total volume of the mixture.

12. A method according to claim 8, in which the amount of air/gas mixed with the waste water is from 20% to 30% based on the total volume of the mixture.

13. A method according to claim 7, in which the intimate mixture of gas/air bubbles and waste water is discharged from the hydrocyclone to a further processing step or stage which allows separation of the two dissimilar materials from each other.

14. A method according to claim 13, in which the further processing step or stage includes a separation step in which oil is separated from the water in a separation tank, vessel or setting tank.

15. A hydrocyclone for forming an intimate mixture of a first material and a second material, wherein the first material comprises a mixture of two dissimilar components, said hydrocyclone comprising a first inlet means for admitting the first material to the hydrocyclone, a pump conveying the first material to the hydrocyclone, a second inlet means for admitting the second material, said second inlet located upstream of the pump, a mixing chamber for forming an intimate mixture of the first and second materials under conditions of shear, and an outlet means for discharging the intimate mixture of the first and second materials, whereby separation of the two dissimilar components of the first material from each other is facilitated by the formation of the intimate mixture of the first and second materials under conditions of shear in the hydrocyclone.

16. A hydrocyclone according to claim 15, in which the hydrocyclone is provided with a single inlet.

17. A hydrocyclone according to claim 16, in which the second inlet is an air injection port or venturi located in the conduit leading to the first inlet so that air or gas is mixed with the waste water to form a mixture prior to admitting the mixture to the hydrocyclone.

18. A hydrocyclone according to claim 15, in which the outlet is a single outlet or two outlets, with the proviso that if there are two outlets the two outlets are joined together to form a single stream of intimately mixed materials.

19. A hydrocyclone according to claim 15, in which the first material is a waste water, a waste liquid, an aqueous solution or aqueous residue containing a contaminant.

20. A hydrocyclone according to claim 15, in which the second material is a gas, air, nitrogen, oxygen or natural gas.

21. A hydrocyclone according to claim 17, in which the hydrocyclone is provided with an outlet means for discharging the intimate mixture of gas/air bubbles and waste water to a further processing step or stage for separation of the dissimilar components from each other.

22. A hydrocyclone according to claim 15 further including a control means for controlling the amount of air admitted to the hydrocyclone.

23. A hydrocyclone according to claim 22 in which the control means is a control valve located in a conduit leading to the hydrocyclone.

24. A hydrocyclone according to claim 23 in which the control valve controls the amount of gas admitted to the conduit by an aspiration unit located in the conduit.

25. A hydrocyclone according to claim 15 which is a coalescing hydrocyclone.

* * * * *